United States Patent

[11] 3,588,884

[72] Inventors Umar Quereshi;
Thomas Richard Fortescue, Farnborough, England
[21] Appl. No. 730,038
[22] Filed May 17, 1968
[45] Patented June 28, 1971
[73] Assignee The Solartron Electronic Group Limited Farnborough, England
[32] Priority May 23, 1967
[33] Great Britain
[31] 23,981/67

[54] ANALOG-TO-DIGITAL CONVERTERS
13 Claims, 5 Drawing Figs.

[52] U.S. Cl. .......... 340/347
[51] Int. Cl. .......... H03k 13/17
[50] Field of Search .......... 340/347

[56] References Cited
UNITED STATES PATENTS

| | | | |
|---|---|---|---|
| 2,761,968 | 9/1956 | Kuder .......... | 340/347X |
| 2,796,314 | 6/1957 | Bishop et al. .......... | 346/33 |
| 2,918,574 | 12/1959 | Gimpel et al. .......... | 340/347X |
| 3,296,613 | 1/1967 | Anderson et al. .......... | 340/347 |

*Primary Examiner*—Daryl W. Cook
*Assistant Examiner*—Gary R. Edwards
*Attorneys*—William R. Sherman, Stewart F. Moore and Jerry M. Presson

ABSTRACT: In a successive approximation digital voltmeter the digital logic is time shared between successive ranges. The comparison signal is built up by analog integration of the contributions switched in by the logic in each range, such contributions being scaled down by a factor of 10 for each successive range. Number tubes are used to display the digits for the successive ranges as determined by the logic but again the logic controlling the tubes is time shared, reliance being placed upon persistence of vision to synthesize the complete digital readout.

PATENTED JUN 28 1971 3,588,884

SHEET 1 OF 5

INVENTORS
Thomas Richard Fortescue
Umar Querishi
BY J M Presson
ATTORNEY

ANALOG-TO-DIGITAL CONVERTERS

This invention relates to analog-to-digital converters of the successive approximation type. Such converters are well known and are commonly used as digital voltmeters. The input signal is first compared with a series of values of one order of magnitude to find which value approximates the input, thus determining the most significant digit of the measurement, the residual input is next compared with a series of values of the next lower order of magnitude to determine the next digit, and so on.

A major item in the cost of such voltmeters lies in the many bistables and precision resistors used to control the series of comparison values of the successive orders of magnitude and the object of the invention is to enable this cost to be reduced significantly. It will also be shown that, if desired, a further saving of cost may be made in the components used to provide a visual display of the digital measurement.

According to the present invention there is provided a successive approximation analog-to-digital converter comprising, not more than one source of sequential pulses, signal storage means for storing each received pulse and producing a cumulative output signal for comparison with an analog input signal, means for comparing the cumulative output signal with an analog input signal and producing a comparing means output signal when the cumulative output signal attains a level determined by the analog signal, and means interposed between said source and said storage means responsive to said comparing means output signal for changing the range value of the pulses supplied to said storage means, the number of pulses applied to said storage means providing a digital indication of the magnitude of the analog signal.

In effect, the invention replaces the digital storage of the bistables of a conventional successive approximation voltmeter with a cheaper, single analog store, enabling the means which generate the comparison values to be time-shared among successive ranges. If desired, the decoding means used to operate a visual display (e.g. digit tubes) may also be time-shared, reliance being placed upon persistence of vision to synthesize the display of all digits.

Figure 1:
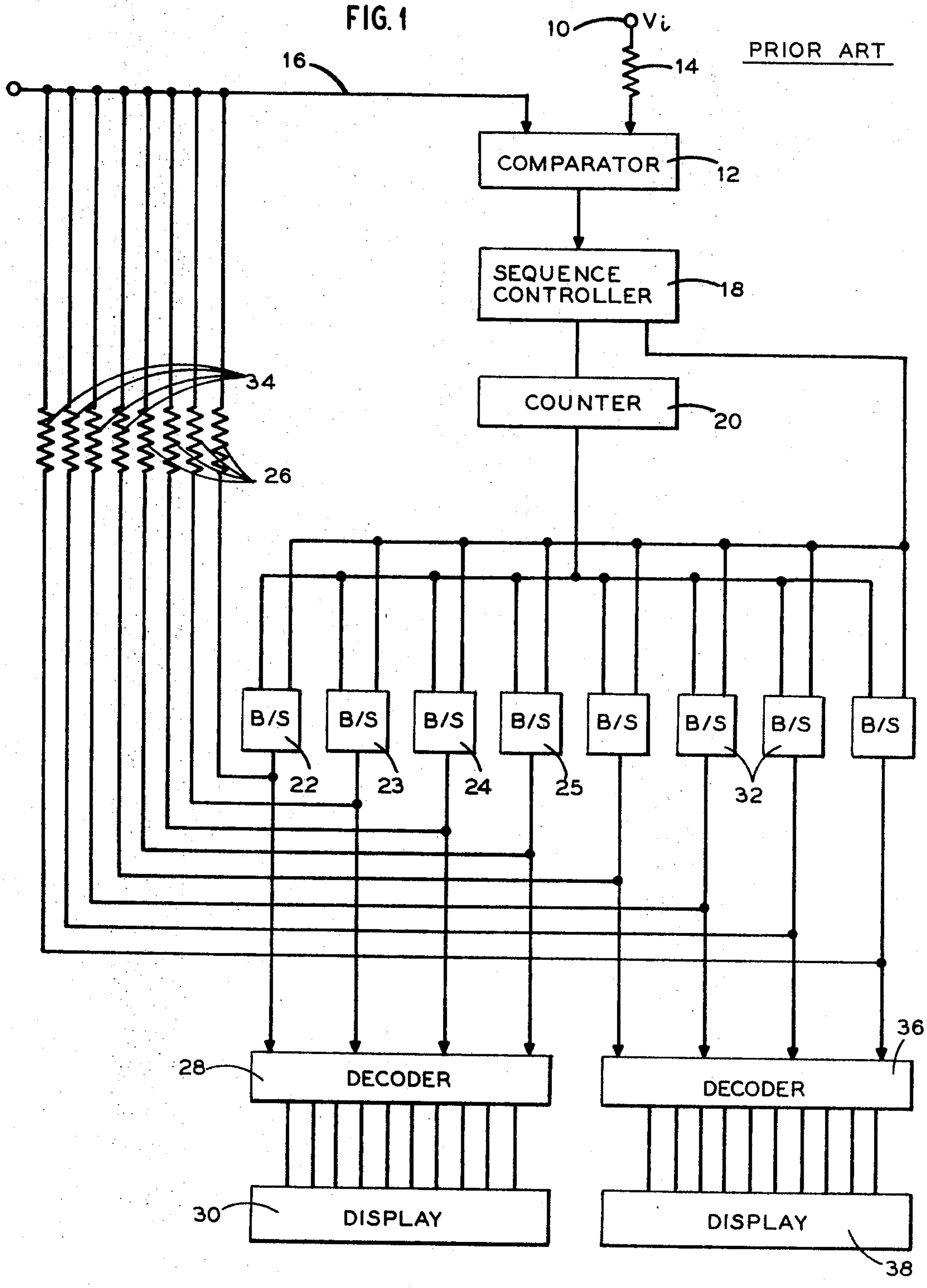
Figure 2:
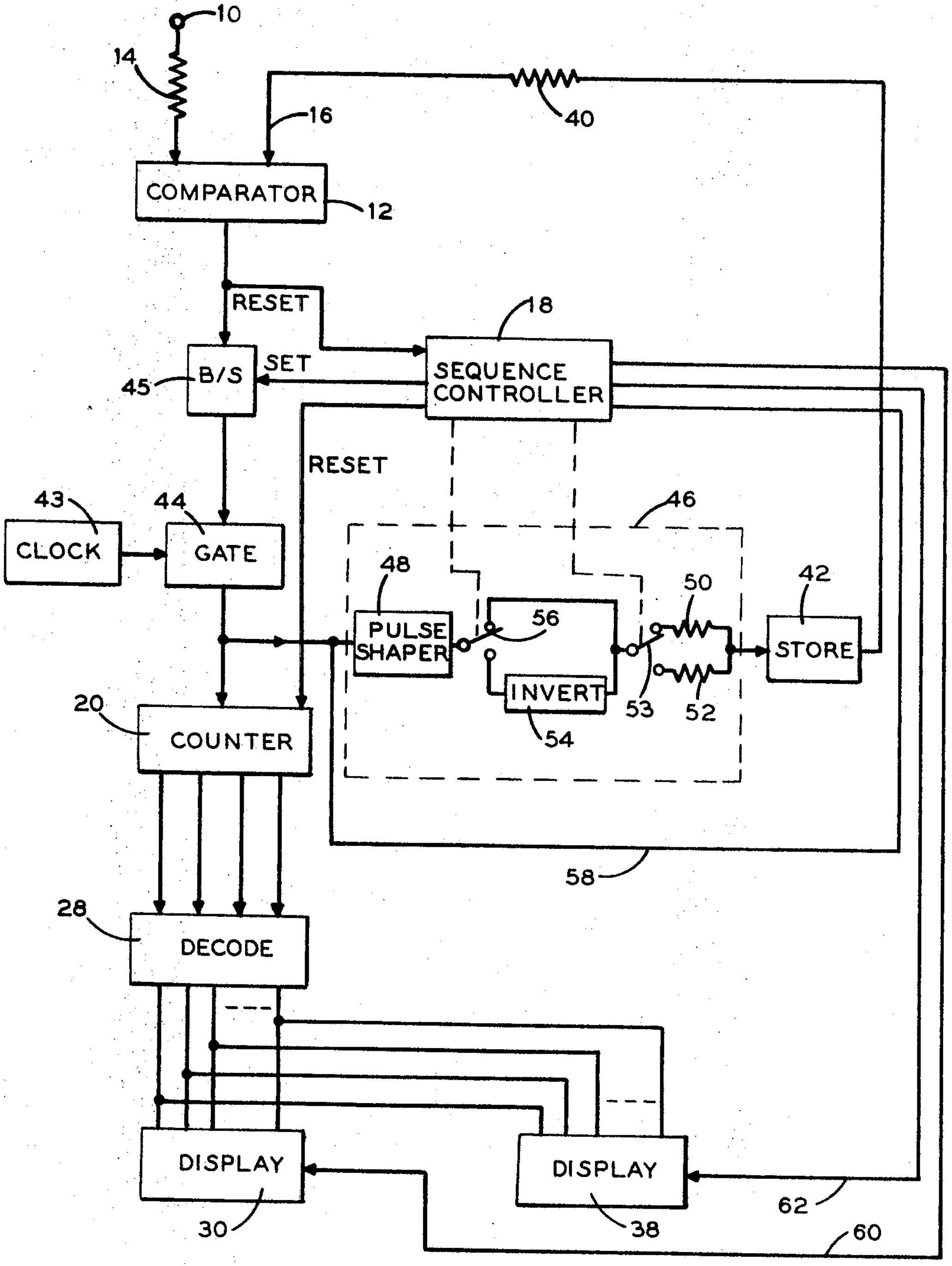
Figure 3:
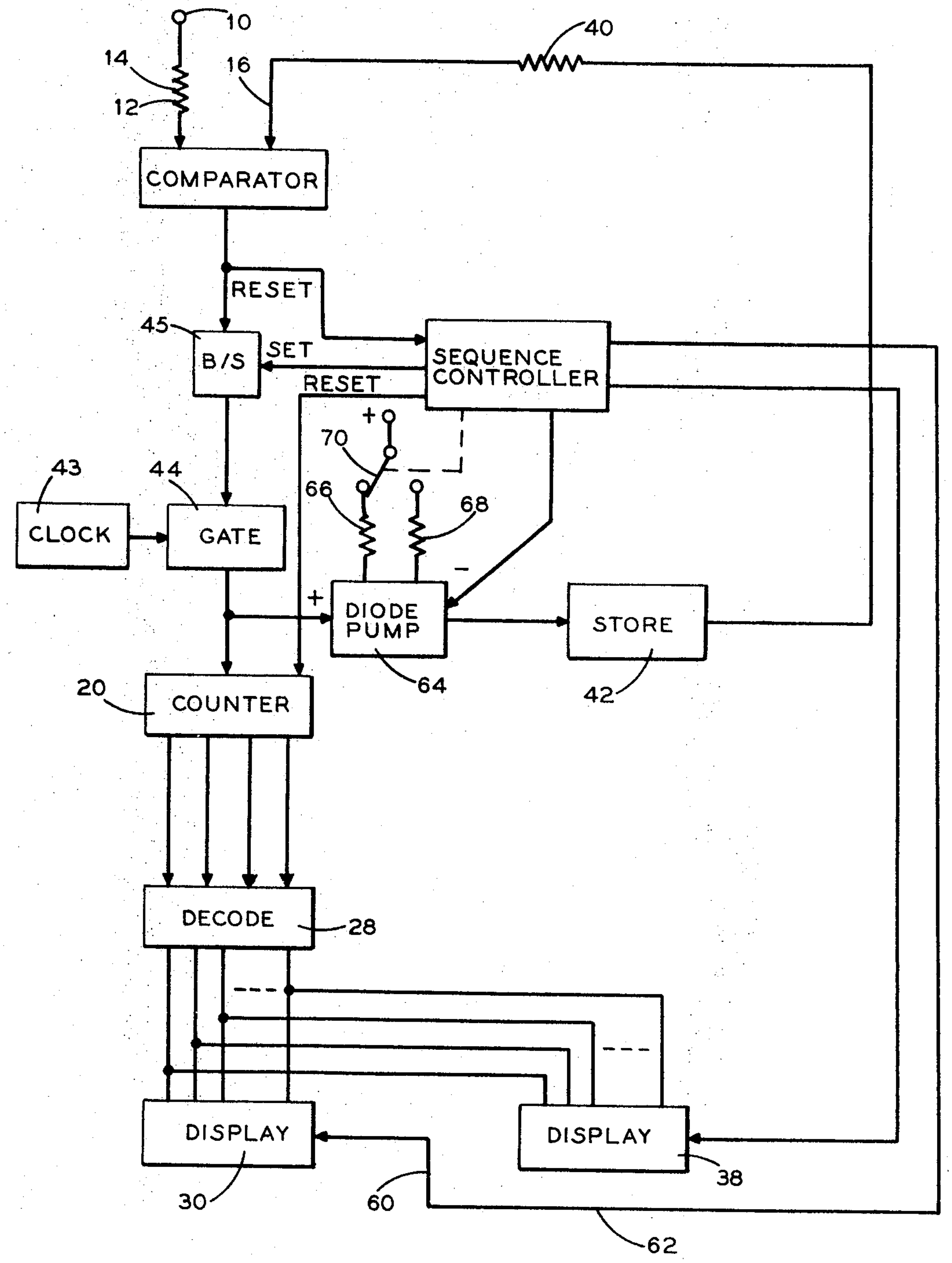
Figure 4:
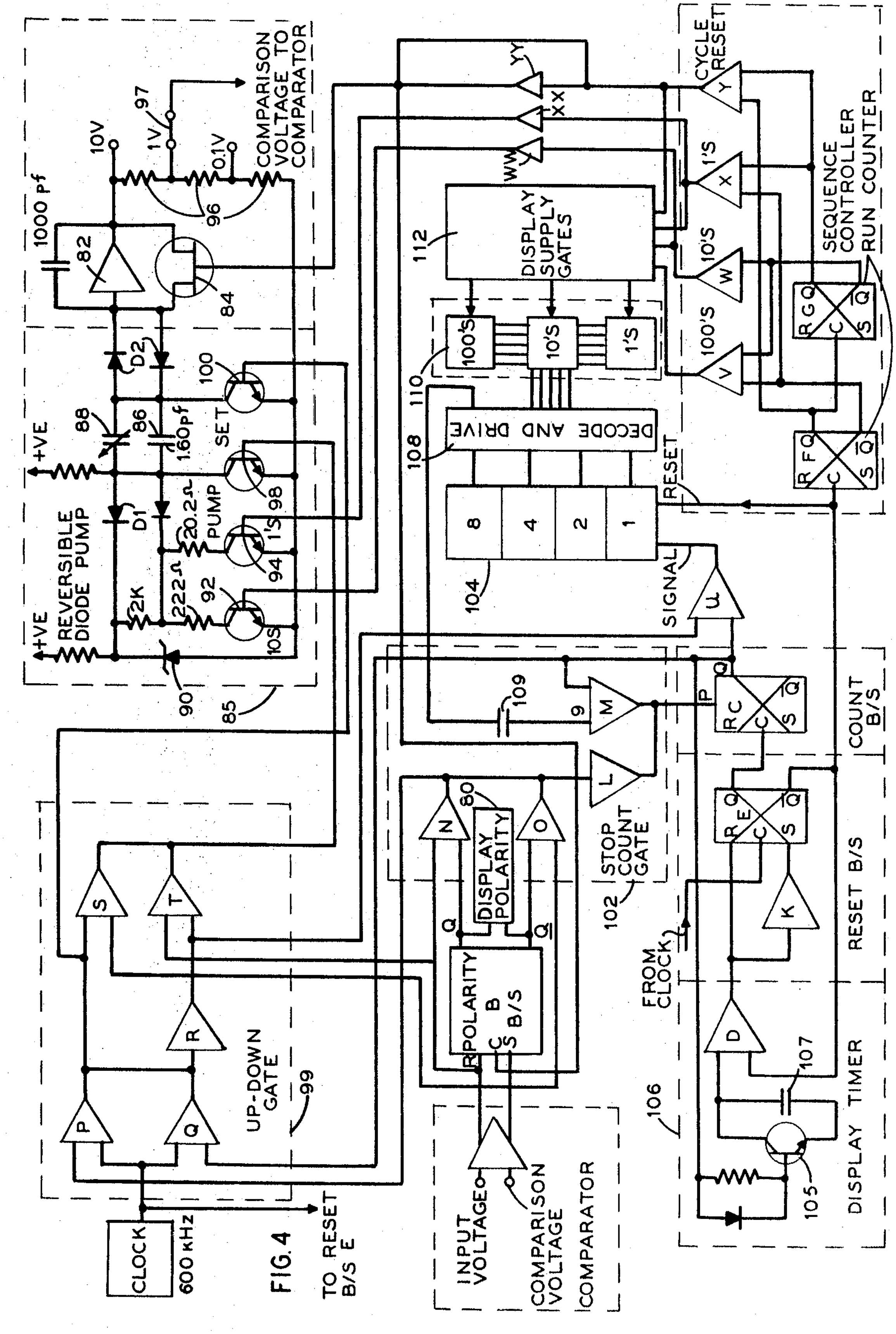
Figure 5:
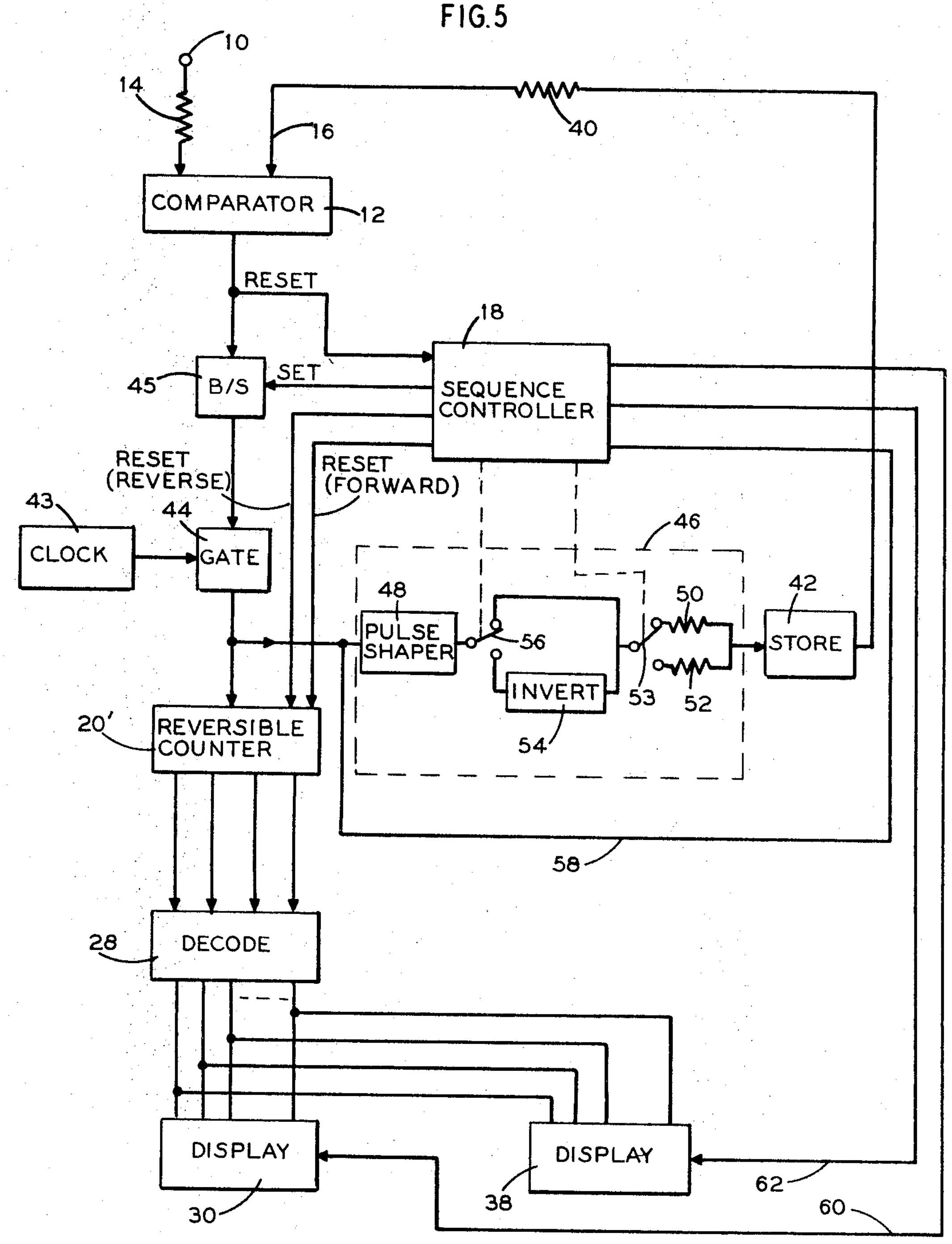

The invention will be described in more detail, by way of example, with reference to the accompanying drawings, in which:

FIG. 1 is a block diagram of a known successive approximation voltmeter, FIGS. 2 and 3 are block diagrams of two different embodiments of the invention, FIG. 4 is a more detailed block diagram of the second embodiment and FIG. 5 is a block diagram of a further embodiment.

For convenience it will be assumed that each embodiment operates on the basis of a binary coded decimal code 4, 2, 2, 1 although other codes may of course be used. Only two decade stages will be described with reference to FIGS. 1 to 3 since the extension to more than two is obvious.

In the known arrangement of FIG. 1 the input voltage is applied to a terminal 10 and current flows to a current comparator 12 through a resistor 14. A comparison current is also applied to the comparator 12 at an input 16 and the output of the comparator, applied to a sequence controller 18, indicates which of the two currents is the larger. The controller 18 causes a ring counter 20 to progress through states 0, 1, 2 .... Four bistable circuits 22, 23, 24 and 25 corresponding to weighting values of 40, 20, 20 and 10 respectively are operated in turn by the counter and feed currents through corresponding weighted resistors 26 to the terminal 16. The comparison current thus generated increases until it exceeds the input current, whereupon the controller 18 resets the bistable providing the excessive comparison current. The process continues until each of the four bistables has been interrogated and on completion of such interrogation the bistables 22 to 25 are left storing in binary coded decimal the most significant digit of the measurement. This digit is decoded by a decoder 28 and displayed by a unit 30, e.g. a number tube.

The sequence controller then deals with the next decade range by interrogating in just the same way another four bistables 32 which control weighted resistors 34 corresponding to values 4, 2, 2 and 1. This leaves the second digit in the bistables 32. This digit is decoded and displayed by units 36 and 38 respectively.

Much of the expense of this known voltmeter lies in the many bistables and corresponding precision resistors (eight in the simple example described and correspondingly more in voltmeters reading to 3 or 4 decimal digits) and also in the decoders 28 and 36. An embodiment of the invention which time shares several components will now be described.

In FIG. 2 the input terminal 10 is connected as before through the resistor 14 to the comparator 12. The comparison current at input 16 is however derived through a single resistor 40 from an analog store 42. So long as the input current exceeds the comparison current the comparator leaves a gate 44 open to allow clock pulses from a source 43 to pass through the gate to the counter 20. The pulses are also applied through a scaler 46 to the store 42 which integrates the pulses. The store 42 can consist of an integrating amplifier. A pulse shaper 48 supplies two alternative precision resistors 50 and 52 of magnitude R and 10R respectively, and these resistors are selected by a switch 53. The output of the shaper 48 can be applied to the selected resistor either direct or through an inverter 54 under the control of a switch 56. When the comparison current exceeds the input current the comparator resets a bistable 45, closes the gate 44 and thereby terminates the transmission of pulses to the counter 20 and the store 42.

In operation, the sequence controller 18 initially disposes the switches 53 and 56 as shown and resets the counter 20 to −1 (i.e. 9). The controller then sets the bistable 45 to open the gate 44. The unknown input current exceeds the comparison current (initially zero) derived from the store 42 and the gate 44 remains open to pass clock pulses to the counter 20. Each pulse causes the pulse shaper 48 to feed a pulse of defined amplitude through the resistor 50 to the integrating store 42. As soon as the sequence controller senses that the comparator output has changed as a result of the comparison current exceeding the unknown input current, the bistable 45 is reset to close the gate 44. The sequence controller also senses the change in the comparator output and momentarily changes over the switch 56 and applies one pulse over line 58 to the input of the scaler 46 to subtract a pulse from the store 42 and so bring back the comparison current to a value less than the input current. Since the counter was originally set to − 1, its value does not have to be changed and the number therein is decoded by the decoder 28 and displayed by the unit 30 which receives a pulse at this time over line 60 from the controller. To this end the cathodes of the number tubes 30 and 38 can be paralleled to the output of the decoder 28 and the sequence controller can pulse the anodes of the number tubes individually.

The next and immediately following operation of the sequence controller is to change over the switch 53 and reset the counter 20 to −1. The store 42 is maintain at the level obtained by the previous subtraction of a pulse therefrom. The bistable 45 is again set and the gate 44 is reopened to pass pulses from the shaper 48 through the 10R resistor 52 to the store and clock pulses to the counter. When the comparator output again changes as a result of the store 42 again providing a comparison signal of greater magnitude than the unknown input signal coincidentally applied to the comparator, the second digit of the measurement is in the counter 20 and is displayed by pulsing the anode of the tube 38 over line 62.

Since 1000 readings per second are readily obtainable with a successive approximation voltmeter, persistence of vision can be relied upon to combine the displays of the tubes 30 and 38 into a digital readout of the input signal magnitude. However, each tube is only pulsed for a very brief interval of time at the end of the period corresponding to its decade range. If necessary, each tube can be kept energized for the major part of a complete period by interposing a single decade staticiser (or buffer storage register) between the counter 20 and the tubes 30 and 38, either before or after the decoder 28. It is of course possible to include (at greater expense) a decade staticiser for each number tube. The apparatus can still be constructed cheaper than the known apparatus because of the elimination of many of the bistables and precision resistors of FIG. 1.

Another embodiment of the invention is shown in FIG. 3. This differs from FIG. 2 only in the way in which the potential on the store 42 is built up on the different ranges. Thus the pulses from the gate 44 are fed to a diode pump 64 which feeds charge to the store 42. The size of the increments of charge is determined by potential divider resistors 66 and 68 selected by a switch 70. The size of the increments, and hence also the size of the steps of the staircase waveform generated by the integrating store 42 drops by a factor of 10 when resistor 68 is substituted for resistor 66.

Initially the sequence controller selects the resistor 66, resets the counter to −1 and sets the bistable 45 to commence the measurement. The diode pump commences to operate and the store 42 generates its output staircase waveform, which is compared with the input by the comparator 12. When the comparator output changes, so resetting the bistable 45, the controller causes the first digit to be displayed as already described and applies a negative pulse from the diode pump 64 to bring the output back below the input. The controller resets the counter to −1, changes over the switch 70 to select the resistor 68 and sets the bistable 45 to commence the second range of measurement. The remainder of the operation will be apparent from the description of FIG. 2.

The embodiments of FIGS. 2 and 3 have both been somewhat idealized in order to present the invention clearly and avoid unnecessary confusion with details of the logic. In practice of course mechanical changeover switches are not used. FIG. 4 is a more detailed showing of the embodiment of FIG. 3 utilizing amplifiers and NAND gates, both effecting inversion and bistables, identified by letters A, B, etc. Positive logic is used herein, i.e. a binary digit (or "bit") 1 is positive relative to a binary digit 0. The embodiment is capable of handling input voltages of either polarity, a polarity bistable B initially being set to one state or the other in accordance with the polarity detected by the comparator amplifier A. The polarity is displayed by a lamp unit 80. The embodiment is further developed to handle three decades, namely 100's, 10's and 1's selected by gates V, W and X respectively which open when bistables F and G are in states 0 and 0, 1 and 0 and 0 and 1 respectively. When these bistables, forming a run counter controlling the successive stages of each cycle or run, go to states 1 and 1, a cycle reset gate Y opens and resets an integrating amplifier 82 by means of a field effect transistor 84. This amplifier constitutes the store 42 of FIG. 3.

The bistables B and E are R–S flip-flops for which the output Q goes to or stays at 1 when the input C goes to 0 and the input R=1, while the output Q goes to or stays at 0 when the input C goes to 0 and the input S=1. (The symbols C, P, Q, R, S, used to identify flip-flop inputs and outputs in conventional manner will not, of course, be confused with the reference C to the count bistable and the references P, Q, R and S to gates in the up-down gate. In what follows Q(E) means the Q output of E and so on). The bistables C, F and G are R–S flip-flops cross-coupled to act as J–K flip-flops which change state every time the input C goes to 0. In addition, the bistable C has an overriding presetting or asynchronous input P which puts Q(C)=0 for P(C)=0.

The pump circuit 85 is a reversible diode pump with a pump capacitor 86 shunted by a calibration capacitor 88. For the 100's range the charging potential for the diode pump is determined by a zener diode 90. For the 10's and 1's ranges potential dividers are brought into play by transistors 92 and 94 controlled by W and X respectively. A tapped potential divider 96 on the output of the amplifier 82 with a tapping switch 97 enables a 10 v., 1 v. or 0.1 v. range to be selected.

The pump is operated by transistors 98 and 100 from an up-down gate 99 which also performs the function of subtracting one pulse from the store when the comparator output changes. The updown gate 99 is responsive to the comparator output to select the correct pump polarity for the applied input polarity and automatically reverses the polarity for the subtracted pulse because of the switching of the comparator output. The subtraction operation takes place under the control of a stop count gate 102 which also operates the count bistable C. This in turn operates the display timer 106. When the voltage across the timing capacitor has run up until gate D sees two 1's, the next clock pulse is permitted to operate the reset bistable E which moves on the run counter F and G so as to select the next range of operation as well as resetting the display counter 104 to 9 (−1). The following clock pulse resets the bistable E, thus operating the count bistable C and opening gate U and the up-down gate 99. Operation of E is delayed by the display timer 106 in which a capacitor runs up until a gate D sees two 1's, to provide sufficient time for display.

The display counter counts from 9 in response to pulses from R in the up-down gate 99 and its count is decoded to standard decimal form by a decoding and driving circuit 108 which feeds the cathodes of three display tubes 110 in parallel. The anode of the correct tube for the selected range is energized via gates 112 and under the control of V, W, X and C.

Further description will be given mainly in the abbreviated form of truth tables.

TABLE 1

INITIAL CONDITIONS

F=G=1 Integrating amplifier 82 reset
D=1 A positive input voltage assumed

Then the outputs of the various below-listed circuit blocks or components are in the binary states appearing immediately opposite their respective components:

| | | | | | |
|---|---|---|---|---|---|
| A | 1 | P | 1 | N | 0 |
| Q(B) | 1 | Q | 1 | O | (1) |
| Q(C) | 0 | R | 0 | V | 1 |
| D | 1 | S | 1 | W | 1 WW=0 |
| Q(E) | 0 | T | 1 | X | 1 XX=0 |
| Set | 0 | U | 1 | Y | 0 YY=1 |
| Pump | 0 | | | | |

Referring now to truth Table 1, the state of gate 0 is placed in brackets, as its input should give the output 1. But in the logic convention used, a zero takes precedence over a one, and as the outputs of gates N and O are in parallel, the zero output of gate N takes precedence over the one output of gate O. Brackets in the following tables denote similar situations. In the next table, designated TABLE 11, Z denotes the state when D changes to 0, i.e. when D sees two 1's.

Thus with WW=XX=0 the transistors 92 and 94, respectively, are cut off and YY=1 causing the FET 84 to turn on and reset the integrating amplifier 82, whose output then goes to 0 volts. The comparator A therefore compares the input voltage with 0 volts and the comparator output sets the bistable B, which has Y=0 on its C input, in accordance with the polarity of the input voltage.

This takes place while the capacitor 107 in the display timer is charging from 0 to 1, whereupon D sees two input ones, so D output = 0, K output = 1 and E changes state on the next received clock pulse. The various states of these components are tabulated to form the first column of Table 11.

TABLE II

| Component: | Time → | | | | | | |
|---|---|---|---|---|---|---|---|
| Clock | Z | 0 | 1 | 0 | 1 | 0 | 1 |
| A | 1 | 1 | 1 | 1 | 1 | 1 | 1 |
| Q(B) | 1 | 1 | 1 | 1 | 1 | 1 | 1 |
| Q(C) | 0 | 0 | 0 | 1 | 1 | 1 | 1 |
| D | 0 | 1 | 1 | 1 | 1 | 1 | 1 |
| Q(E) | 0 | 1 | 1 | 0 | 0 | 0 | 0 |
| N | 0 | 0 | 0 | 0 | 0 | 0 | 0 |
| O | (1) | (1) | (1) | (1) | (1) | (1) | (1) |
| P | 1 | 1 | 1 | 1 | (1) | 1 | (1) |
| Q | 1 | 1 | 1 | 1 | 0 | 1 | 0 |
| R | 0 | 0 | 0 | 0 | 1 | 0 | 1 |
| S | 1 | 1 | 1 | 1 | (1) | 1 | (1) |
| T | 1 | 1 | 1 | 1 | 0 | 1 | 0 |
| U | 1 | 1 | 1 | 1 | 0 | 1 | 0 |
| V | 1 | 0 | 0 | 0 | 0 | 0 | 0 |
| W | 1 | 1 | 1 | 1 | 1 | 1 | 1 |
| X | 1 | 1 | 1 | 1 | 1 | 1 | 1 |
| Y | 0 | 1 | 1 | 1 | 1 | 1 | 1 |
| Set | 0 | 0 | 0 | 0 | 1 | 0 | 1 |
| Pump | 0 | 0 | 0 | 0 | 1 | 0 | 1 |

After the second Column of the above truth Table 11, YY=0, unclamping the integrator 82, and the 100's scaling and display system has been selected by V since $\overline{Q}$(E) going to 0 changes Q(F) and Q(G) from ones to zeros, and also resets the display.

Since the $\overline{Q}$(E) is now 0, D=1, putting a 1 on S(E) which returns $\overline{Q}$(E) to 1 the next time the clock goes to 0. $\overline{Q}$(E) going to 1 causes Q(C) to go to 1 to opens U to allow pulses from the up-down gate 99 to be counted simultaneously with operation of the pump transistor 98. The change of Q(C) to 1 is permitted because P(C) is a 1 at this time. This is so because either gates O or N sees two 1's so L must be 1 and M must also be 1 because the input 9 thereto is AC coupled through a capacitor 109 and M is thus edge-triggered only when the decoder 108 goes from 8 9. At this stage P(C) goes to 0 and the count is stopped by Q(C) going to 0. The alternative stop to the count, controlled by the comparator and caused by L=0 is described below.

The counting of clock pulses takes place as follows. The gate P=1 but the gate Q passes clock pulses and S or T is open to pass these, depending upon the output of A.

Unless M has gone to 0 as described above the count continues by application of clock pulses to the pump and set transistors 98 and 100 until the output of A changes sign, so that A ≯ B. This puts N=O=1 which puts Q(C) =0 through L and also opens P, while Q closes. One further, uncounted, clock pulse passes through P, but as the gates S and T have been changed over, this pulse is effectively subtracted and restores A to its initial state (=B). If the initial error were an error voltage +V*e*, the counted pulses pass through T and the uncounted, subtracted pulse passes through S, and vice versa. Charge is always pumped into the integrating amplifier 82 when SET = 1 which requires (P + Q)=0 which in turn requires CLOCK = 1. For the system to work, the integrator must have settled before SET returns to zero, so the comparator must change state for CLOCK = 1 and before the clock returns to zero. Thus when the comparator changes, the sequence is as shown in the following Table 111.

In Table 111, the fourth column under the second 1 clock pulse is divided into two. The left-hand one of these columns indicates the state immediately after the clock goes to 1. The pump transitor 98 then starts to pump charge out of the integrator, to subtract one bit from it. At some time during this operation the comparison voltage falls below input voltage and so comparator A switches back resulting in the state indicated in the right-hand column of the bracketed pair.

TABLE III

| Component: | Time | | | | | | |
|---|---|---|---|---|---|---|---|
| Clock | 0 | 1 | 0 | 1 | | 0 | 1 |
| A | 1 | 0 | 0 | 0 | 1 | 1 | 1 |
| Q(B) | 1 | 1 | 1 | 1 | 1 | 1 | 1 |
| Q(C) | 1 | 0 | 0 | 0 | 0 | 0 | 0 |
| D | 1 | | 1 | 1 | 1 | 1 | 1 |
| Q(E) | 0 | 0 | 0 | 0 | 0 | 0 | 0 |
| N | 0 | 1 | 1 | 1 | 0 | 0 | 0 |
| O | (1) | 1 | 1 | 1 | (1) | (1) | (1) |
| P | 1 | 0 | 1 | 0 | 1 | 1 | 1 |
| Q | 1 | (1) | 1 | (1) | 1 | 1 | 1 |
| R | 0 | 1 | 0 | 1 | 0 | 0 | 0 |
| S | 1 | 1 | 0 | 1 | 1 | 1 | 1 |
| T | 1 | 1 | (1) | 1 | 1 | 1 | 1 |
| U | 1 | 1 | 1 | 1 | 1 | 1 | 1 |
| V | 0 | 0 | 0 | 0 | 0 | 0 | 0 |
| W | 1 | 1 | 1 | 1 | 1 | 1 | 1 |
| X | 1 | 1 | 1 | 1 | 1 | 1 | 1 |
| Y | 1 | 1 | 1 | 1 | 1 | 1 | 1 |
| Set | 0 | 1 | 0 | 1 | 0 | 0 | 0 |
| Pump | 0 | 0 | 1 | 0 | 0 | 0 | 0 |

With Q(C)=9, the transistor 105 in the display timer is off and the capacitor 107 again charges from 0 to 1. While so doing the 100's decade is being displayed.

When D again sees two 1's and goes to 0, the cycle repeats for 10's decade but on this occasion, when $\overline{Q}$(E) goes to 0 we have Q(F)=1, Q(G)=0, I W=0, WW=1 and the transistor 92 is conductive. All this occurs with transistor SET = 0 so the change in bit size does not affect the integrator.

TABLE IV

| Component: | Time → | | | | | | |
|---|---|---|---|---|---|---|---|
| Clock | (1) | Z | 1 | 0 | 1 | 0 | 1 |
| A | 1 | 1 | 1 | 1 | 1 | 1 | 1 |
| Q(B) | 1 | 1 | 1 | 1 | 1 | 1 | 1 |
| Q(C) | 0 | 0 | 0 | 0 | 0 | 1 | 1 |
| D | 1 | 0 | 0 | 1 | 1 | 1 | 1 |
| Q(E) | 0 | 0 | 0 | 1 | 1 | 0 | 0 |
| N | 0 | 0 | 0 | 0 | 0 | 0 | 0 |
| O | (1) | (1) | (1) | (1) | (1) | (1) | (1) |
| P | 1 | 1 | 1 | 1 | 1 | 1 | (1) |
| Q | 1 | 1 | 1 | 1 | 1 | 1 | 0 |
| R | 0 | 0 | 0 | 0 | 0 | 0 | 1 |
| S | 1 | 1 | 1 | 1 | 1 | 1 | (1) |
| T | 1 | 1 | 1 | 1 | 1 | 1 | 0 |
| U | 1 | 1 | 1 | 1 | 1 | 1 | 0 |
| V | 0 | 0 | 0 | 1 | 1 | 1 | 1 |
| W | 1 | 1 | 1 | 0 | 0 | 0 | 0 |
| X | 1 | 1 | 1 | 1 | 1 | 1 | 1 |
| Y | 1 | 1 | 1 | 1 | 1 | 1 | 1 |
| Set | 0 | 0 | 0 | 0 | 0 | 0 | 1 |
| Pump | 0 | 0 | 0 | 0 | 0 | 0 | 1 |

[1] Existing State (last col. Table III).

The cycle then repeats, as indicated by the above truth Table IV, with Q(F)=0, Q(G)=1, X=0, XX=1 and the transistor 94 conductive. The final cycle is the reset cycle entered when F=G=1, Y=0 and YY=1. The integrator is reset, i.e. clamped to zero volts. Q(C) is set to 1 in the usual way to establish the "count" state but the integrator output does not change. Hence A does not change and the count is not stopped in the usual way via L. Instead the count stops, as described above, through the operation of M and the circuit is now ready for the next measurement. The display timer operates in the usual way but the 9 in the counter 104 is not displayed because V=W=X=is used to inhibit the gates 112.

Although the logic has been shown and described in some detail with reference to FIG. 4, the techniques employed are all standard and could obviously be varied widely.

Instead of subtracting one pulse from the store 42 of FIG. 2 when the state of the comparator 12 changes, the pulses provided by the integrator and fed to the analog store can be caused to alternate in polarity from range to range. One arrangement for effecting such an operation is shown in FIG. 5 in which the counter 20 is replaced by a reversible counter 20'.

In operation the sequence controller 18 initially disposes the switches 53 and 56 as shown and sets the counter to zero. The controller 18 then sets the bistable 45 to open gate 44. The unknown input current exceeds the comparison current (initially zero), derived from the store 42 and the gate 44 remains open to pass clock pulses to the counter 20. Each pulse causes the pulse shaper 48 to feed a pulse of defined amplitude through the resistor 50 to the integrating store 42. As soon as the sequence controller senses that the comparator output has changed as a result of the comparison current exceeding the unknown input current, the bistable 45 is reset to close the gate 44. The number in the counter 20' is decoded by the decoder 28 and displayed by the unit 30 as described with reference to FIG. 2.

The next and immediately following action of the sequence controller is to change over the switches 53 and 56, reset the counter 20' to zero and to set it to count in the reverse direction. The bistable 45 is again set and the gate 44 is reopened to pass pulses from the pulse shaper 48 to be counter 20' and through the 10R resistor 52 to the store to reduce the magnitude of the signal in the store. When the comparator output again changes sign the second digit is stored in the counter and is decoded and displayed as before and the operation is stopped.

We claim:

1. A successive approximation analog-to-digital converter comprising, not more than one source of clock pulses, signal storage means for storing each received pulse and producing a cumulative output signal for comparison with an analog input signal, means for comparing the cumulative output signal with an analog input signal and producing a comparing means output signal when the cumulative output signal attains a level determined by the analog signal, means interposed between said source and said storage means responsive to said comparing means output signal for changing the range value of the pulses supplied to said storage means, gating means responsive to said comparing means output signal for controlling the flow of pulses to said signal storage means and means for separately counting the number of pulses applied to said storage means in each range, the number of said pulses providing a digital indication of the magnitude of the analog signal.

2. The converter as claimed in claim 1, wherein said means for counting further comprises a counter coupled to the input to said signal storage means for counting the number of relatively higher value signals received thereby, first means coupled to the counter for providing an indication of the number of higher value signals counted thereby, and counter reset means also responsive to the cumulative output signal attaining said level for resetting said counter to count the number of relatively lower value signals received by said signal storage means.

3. The converter as claimed in claim 2, which further comprises second means coupled to said counter and responsive to the reattaining of said level for providing an indication of the number of lower value signals received by said signal storage means.

4. The converter as claimed in claim 3, wherein the first and second means comprise respective first and second display tubes.

5. The converter as claimed in claim 3, which further comprises a decoder coupled to said counter for decoding the signal count registered by said counter, said decoder being time-shared by said first and second means.

6. The converter as claimed in claim 1, wherein said signal storage means comprises an integrator.

7. The converter as claimed in claim 1, wherein said means for changing the range value of the pulses supplied to said storage means comprises a switching device and at least two impedances coupled to said switching device and to said source for changing the level of the pulses supplied to said storage means in accordance with the state of said switching device.

8. A successive approximation analog-to-digital converter comprising, a source for providing a train of signals, a storage device for cumulatively storing signals applied thereto and for producing a device output signal corresponding in magnitude to the cumulative value of the received signals, means for coupling successive trains to signals from said source to said storage device, a comparator for comparing the magnitude of the storage device output signal with the magnitude of an analog input signal of unknown magnitude and producing a comparator output signal when the device output signal resulting from a first train of signals exceeds a level determined by the magnitude of the analog signal, a counter for counting the number of signals received by said storage device, first means responsive to the comparator output signal for reducing by a predetermined factor the magnitude of the train of signals next received by said storage device from said source, second means responsive to the comparator output signal for reducing the magnitude of the composite signal in said storage device by a predetermined amount, and third means responsive to said comparator output signal for resetting said counter to count the number of reduced-magnitude signals next received by said storage device from said source until said level is reattained by the resulting cumulative output signal.

9. The converter as claimed in claim 8 wherein said second means comprises a diode pump coupled to the input of said storage device.

10. An analog to digital converter comprising, a comparator for comparing the relative magnitudes of an analog input signal and a cumulative signal and producing an output signal when the analog signal magnitude exceeds the cumulative signal magnitude, a source of first and second trains to pulses of respectively different magnitudes, the magnitude of the pulses of the second train being less than that of the first train, a storage device for storing signals received thereby and providing a first cumulative signal for said comparator, switch means for selectively connecting said storage device to said source, said device being connected initially to receive the first train of pulses and producing a cumulative output signal representative of the number of the first train of pulses so received, means responsive to said comparator output subtracting a pulse of said first train from said storage device so that the resulting first cumulative signal for said comparator becomes less than the input signal, said switch means also being responsive to the comparator output signal to connect said storage device to receive t he second train of pulses whereby a second cumulative output signal is provided for said comparator, and a counter for counting the number of pulses providing the first and second cumulative output signals to provide at least a plural digit representation of the analog signal magnitude.

11. In combination, means for comparing a received composite signal with an analog input signal of unknown magnitude and producing an output signal when the composite signal magnitude at least attains the analog signal magnitude, first and second sources of respectively different magnitude sequential signals, the magnitudes of individual ones of the first source signals being larger than the magnitude of the individual ones of the second source signals, a storage device having the input thereof selectively connected to said first and second sources for storing cumulatively the signals received from that source of which said storage device is connected to produce the composite signal, said storage device being connected initially to said first source, means responsive to an output signal from the comparing means for subtracting at least one first source signal from said storage device to decrease the composite signal magnitude to a value less than the analog signal magnitude, and means responsive to the output signal from said comparing means for connecting said storage device to said second source so that said storage device receives second source signals until the resulting composite signal magnitude at least attains the analog signal magnitude, and means for counting the number of first and second signals.

12. A successive approximation analog-to-digital converter comprising, not more than one source of sequential pulses, a signal storage device for storing each pulse received from said source and for producing a cumulative output signal for comparison with an analog input signal, means for comparing the cumulative output signal with the analog input signal and producing a comparing means output signal when the cumulative output signal attains a level determined by the analog signal, means interposed between said source and said storage means and responsive to said comparing means output signal for changing the magnitudes of the pulses supplied to said storage means, the number of different magnitude pulses applied to said storage device providing a digital indication of the magnitude of the analog signal, and means coupled to said means for changing the magnitude of the pulses for counting the numbers of pulses of each magnitude received by said storage device.

13. A successive approximation analog-to-digital converter comprising, a source for providing a train of signals, a storage device for storing cumulatively signals applied thereto and producing a device output signal corresponding in magnitude to the cumulative value of the received signals, a comparator for comparing the magnitude of the storage device output signal with the magnitude of an analog input signal of unknown magnitude and producing a comparator output signal in one direction when the device output signal exceeds a level determined by the magnitude of the analog signal, a counter for counting the number of signals received by said storage device, first means responsive to the comparator output signal for reducing by a predetermined factor the magnitude of the train of signals next received by said storage device from said source, means for changing the sign of the train of signals of reduced magnitude fed to the storage device to reduce the magnitude of the device output signal until the comparator produces a comparator output signal in the opposite direction when the magnitude of the device output signal is less than the said level, and third means responsive to said comparator output signal of opposite direction for resetting said counter to count the number of reduced-magnitude signals next received by said storage device from said source until said level is reattained by the resulting cumulative output signal.